United States Patent
Sonoda

(10) Patent No.: US 10,379,519 B2
(45) Date of Patent: Aug. 13, 2019

(54) SERVO CONTROLLER, CONTROL METHOD, AND NON-TRANSITORY COMPUTER-READABLE RECORDING MEDIUM FOR MACHINE TOOL USED FOR OSCILLATING CUTTING

(71) Applicant: FANUC CORPORATION, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

(21) Appl. No.: 15/593,511

(22) Filed: May 12, 2017

(65) Prior Publication Data

US 2017/0329302 A1    Nov. 16, 2017

(30) Foreign Application Priority Data

May 16, 2016 (JP) .................................. 2016-097892

(51) Int. Cl.
*G05B 19/31* (2006.01)
*G05B 19/404* (2006.01)

(52) U.S. Cl.
CPC .......... *G05B 19/31* (2013.01); *G05B 19/404* (2013.01); *G05B 2219/34013* (2013.01);
(Continued)

(58) Field of Classification Search
CPC .......... G05B 19/31; G05B 2219/49314; G05B 2219/45044; G05B 2219/34013; G05B 2219/36263
(Continued)

(56) References Cited

U.S. PATENT DOCUMENTS

| 4,220,186 A * | 9/1980 | Sybertz ................. B27L 11/005 144/174 |
| 8,779,712 B2 * | 7/2014 | Tanabe .................... H02P 23/30 318/400.07 |

(Continued)

FOREIGN PATENT DOCUMENTS

JP   2010-009094 A   1/2010
JP       5033929 B1   9/2012
(Continued)

OTHER PUBLICATIONS

An Office Action mailed by the Japanese Patent Office dated Jul. 3, 2018, which corresponds to Japanese Patent Application No. 2016-097892 and is related to U.S. Appl. No. 15/593,511; with partial English Translation.

*Primary Examiner* — Ziaul Karim
(74) *Attorney, Agent, or Firm* — Studebaker & Brackett PC

(57) ABSTRACT

A controller that controls a machine tool, a method of controlling a machine tool, and a computer program that causes a computer to operate as a controller that controls a machine tool, the machine tool comprising multiple control axes and used for machining by cutting of a work as a machining target by means of coordinated motion of the control axes. The method includes acquiring a position command for driving a cutting tool or the work, acquiring a rotation speed of the rotated cutting tool or the rotated work, calculating oscillation amplitude, calculating an oscillation frequency, calculating an oscillation command for causing the cutting tool and the work to oscillate relative to each other, storing a command route, correcting the oscillation command based on the stored command route, determining a drive signal to be used for driving the servo motor, and outputting the drive signal.

9 Claims, 4 Drawing Sheets

(52) U.S. Cl.
CPC .............. *G05B 2219/36263* (2013.01); *G05B 2219/45044* (2013.01); *G05B 2219/49176* (2013.01); *G05B 2219/49314* (2013.01); *G05B 2219/50218* (2013.01)

(58) Field of Classification Search
USPC ......................................................... 700/187
See application file for complete search history.

(56) References Cited

U.S. PATENT DOCUMENTS

| | | | | |
|---|---|---|---|---|
| 2003/0178518 | A1* | 9/2003 | Nemedi | ................ B02C 18/146 |
| | | | | 241/243 |
| 2014/0102268 | A1 | 4/2014 | Hariki et al. | |
| 2016/0011579 | A1* | 1/2016 | Watanabe | .......... G05B 19/4103 |
| | | | | 700/187 |

FOREIGN PATENT DOCUMENTS

| | | | | |
|---|---|---|---|---|
| JP | 2013-103279 | A | 5/2013 | |
| JP | 5599523 | B1 | 10/2014 | |
| JP | 2016-066593 | A | 4/2016 | |
| WO | 2004/102290 | A1 | 11/2004 | |
| WO | 2014/125569 | A1 | 8/2014 | |
| WO | WO-2015140905 | A1 * | 9/2015 | ........... G05B 19/404 |
| WO | 2015/146945 | A1 | 10/2015 | |
| WO | 2016/031897 | A1 | 3/2016 | |
| WO | 2016/067371 | A1 | 5/2016 | |
| WO | 2016/067372 | A1 | 5/2016 | |

\* cited by examiner

SERVO CONTROLLER, CONTROL
METHOD, AND NON-TRANSITORY
COMPUTER-READABLE RECORDING
MEDIUM FOR MACHINE TOOL USED FOR
OSCILLATING CUTTING

This application is based on and claims the benefit of priority from Japanese Patent Application No. 2016-097892, filed on 16 May 2016, the content of which is incorporated herein by reference.

BACKGROUND OF THE INVENTION

Field of the Invention

The present invention relates to a servo controller, a control method, and a non-transitory computer-readable recording medium for a machine tool used for machining by cutting of a work by means of coordinated motion of multiple axes.

Related Art

There is a machine tool conventionally known used for machining by cutting of a work as a machining target by means of coordinated motion of multiple axes. According to a machining method employed in some cases for such a machine tool, to shred chips caused by cutting, a cutting tool and a work are caused to oscillate relative to each other in a machining direction.

For example, patent document 1 mentioned below discloses a technique of machining by cutting performed by causing a cutting tool to vibrate at a low frequency. The technique of patent document 1 has a control mechanism that causes the cutting tool to vibrate at a low frequency in a 2-axis direction by controlling a cutting tool feed drive motor. The following data is stored in advance in the form of a table as data that allows actual operation at a low frequency of 25 Hz or more of feeding the cutting tool by synchronizing the cutting tool at least in the 2-axis direction, in a manner that depends on the number of rotations of a work or the number of rotations of the cutting tool and the amount of feed of the cutting tool during one rotation of the work or that of the cutting tool: the amount of forward motion, the amount of backward motion, a forward motion speed, and a backward motion speed of a cutting tool feed mechanism that is responsive to mechanical characteristics on the table such as mass and motor characteristics. Based on the stored data, the cutting tool feed drive motor is controlled. Patent document 1 recites that, by realizing cutting by generating low-frequency vibration optimally, chips are shredded into powder form to make it unlikely that the chips will become attached to the cutting tool. According to patent document 1, however, an oscillation command responsive to the motor characteristics is stored in advance in the table. Hence, low-frequency vibration (oscillation) is considered to be difficult to respond to a change in a machining condition.

Patent document 2 mentioned below discloses a technique by which an oscillation command is generated so as to allow application of vibration along a machining route based on given vibration conditions such as frequency and amplitude. For example, the generated oscillation command is superimposed on a machining command, and a resultant command is distributed to servo control on each axis. More specifically, to move a tool along a movement route relative to a machining target, the tool is caused to vibrate so as to trace the movement route. A command stroke (a stroke given by a movement command) in a unit of time (an interpolation cycle) is calculated using the movement command including the movement route indicating a machining position and a machining speed. A vibration stroke, which is a stroke resulting from vibration occurring in this unit of time at a moment corresponding to the movement command, is calculated using the vibration conditions including frequency and amplitude. The command stroke and the vibration stroke are combined to calculate a composite stroke. Then, a stroke in the unit of time is determined in such a manner that a position determined after movement of the composite stroke is located on a curve movement route. Patent document 2 recites that this method achieves machining under various conditions without the need of preparing a table storing vibration conditions for a tool. Regarding patent document 2, however, applying high-frequency oscillation is considered to cause a probability of failing to give a command precisely, for example. This is considered to become a problematic issue, particularly if an oscillation frequency is increased to approach a command distribution frequency. If the command distribution frequency is 100 Hz and the oscillation frequency is 50 Hz, for example, commands can be given to only two points during one oscillation cycle. This tendency becomes more noticeable if the oscillation frequency is increased further to get closer and closer to the command distribution frequency, and it is considered to make it difficult in some cases to exert elaborate control.

As described above, the conventional technique of controlling a machine tool using oscillation has been considered to cause difficulty in exerting high precision oscillation control with the use of a high oscillation frequency. To solve this issue, the present inventors made studies diligently to develop an improved servo controller capable of making a servo motor achieve oscillate highly precisely, and filed a patent application different from the present application (Japanese Patent Application No. 2016-066593).

This improved servo controller developed uniquely by the present inventors generates an oscillation command based on instruction information (a position command or a rotation speed of a spindle axis) when a higher-order controller gives a distributed command to this servo controller. Thus, a high precision oscillation command can be given. According to this servo controller developed uniquely, however, an oscillation command is generated without consideration of a command route in the past. Hence, if a given command is intended to machine a shape such as an arc-like shape that changes a machining route every moment, for example, it is considered to be impossible in some cases to achieve oscillation along the route.

Patent Document 1: Japanese Patent No. 5033929
Patent Document 2: Japanese Patent No. 5599523

SUMMARY OF THE INVENTION

The present invention has been made in view of the aforementioned problem. The present invention is intended to provide a controller for a machining device capable of making the machining device make oscillating motion along a command route.

(1) A controller according to the present invention (a servo controller 100 described later, for example) is a controller that controls a machine tool comprising multiple control axes and used for machining by cutting of a work (a work 10 or 20 described later, for example) as a machining target by means of coordinated motion of the control axes. The controller comprises: a position command acquiring unit (a position command acquiring unit 120 described later, for example) that acquires a position command directed to a servo motor (a servo motor 400 described later, for example) for driving a cutting tool or a position command directed to a servo motor for driving the work; a rotation speed acquiring unit (a rotation speed acquiring unit 118 described later, for example) that acquires a rotation speed of the rotated cutting tool or that of the rotated work; an oscillation amplitude calculating unit (an oscillation command correcting unit 104 described later, for example) that calculates oscillation amplitude based on the acquired position command and the acquired rotation speed; an oscillation frequency calculating unit (the oscillation command correcting unit 104 described later, for example) that calculates an oscillation frequency based on the acquired rotation speed; an oscillation command calculating unit (the oscillation command correcting unit 104 described later, for example) that calculates an oscillation command based on the calculated oscillation amplitude and the calculated oscillation frequency; a position command storage unit (a position command storage unit 103 described later, for example) that stores a command route determined based on the calculated oscillation amplitude; an oscillation command correcting unit (the oscillation command correcting unit 104 described later, for example) that corrects the oscillation command based on the stored command route; and a driving unit (a position, speed, and current control unit 116 and an adder 106 described later, for example) that determines a drive signal to be used for driving the servo motor based on the acquired position command and the corrected oscillation command, and outputs the drive signal.

(2) In the controller described in (1), to shred chips caused during the cutting, the oscillation command calculating unit may calculate the oscillation command for causing the cutting tool and the work to oscillate relative to each other along a machining route along which the cutting tool travels.

(3) In the controller described in (1) or (2), the oscillation amplitude calculating unit may calculate the oscillation amplitude by determining a stroke during one rotation of the cutting tool or that of the work based on the acquired position command and the acquired rotation speed and by multiplying the determined stroke by a first constant.

(4) In the controller described in any one of (1) to (3), the oscillation frequency calculating unit may calculate the oscillation frequency by multiplying the acquired rotation speed by a second constant.

(5) In the controller described in any one of (1) to (4), the position command storage unit may store the command route which is at least longer than the oscillation amplitude.

(6) In the controller described in any one of (1) to (5), the oscillation command correcting unit may correct the oscillation command so as to cause the cutting tool and the work to oscillate relative to each other along the stored command route.

(7) In the controller described in (3), the first constant may be provided from an external higher-order device and the provided first constant may be used by the controller.

(8) In the controller described in (4), the second constant may be provided from an external higher-order device and the provided second constant may be used by the controller.

(9) In the controller described in any one of (1) to (8), the oscillation command calculating unit may start, stop, or finish calculation of the oscillation command based on a signal given from a higher-order controller.

(10) In the controller described in any one of (1) to (9), the oscillation command correcting unit may start, stop, or finish correction of the oscillation command based on a signal given from a higher-order controller.

(11) A control method according to the present invention is a method of controlling a machine tool comprising multiple control axes and used for machining by cutting of a work as a machining target by means of coordinated motion of the control axes. The method comprises: a position command acquiring step of acquiring a position command directed to a servo motor for driving a cutting tool or a position command directed to a servo motor for driving the work; a rotation speed acquiring step of acquiring a rotation speed of the rotated cutting tool or that of the rotated work; an oscillation amplitude calculating step of calculating oscillation amplitude based on the acquired position command and the acquired rotation speed; an oscillation frequency calculating step of calculating an oscillation frequency based on the acquired rotation speed; an oscillation command calculating step of calculating an oscillation command based on the calculated oscillation amplitude and the calculated oscillation frequency; a position command storing step of storing a command route determined based on the calculated oscillation amplitude into a certain position command storage unit; an oscillation command correcting step of correcting the oscillation command based on the stored command route; and a driving step of determining a drive signal to be used for driving the servo motor based on the acquired position command and the corrected oscillation command, and outputting the drive signal.

(12) A non-transitory computer-readable recording medium storing a computer program according to the present invention causes a computer to operate as a controller that controls a machine tool comprising multiple control axes and used for machining by cutting of a work as a machining target by means of coordinated motion of the control axes. The computer program causes the computer to execute: a position command acquiring procedure of acquiring a position command directed to a servo motor for driving a cutting tool or a position command directed to a servo motor for driving the work; a rotation speed acquiring procedure of acquiring a rotation speed of the rotated cutting tool or that of the rotated work; an oscillation amplitude calculating procedure of calculating oscillation amplitude based on the acquired position command and the acquired rotation speed; an oscillation frequency calculating procedure of calculating an oscillation frequency based on the acquired rotation speed; an oscillation command calculating procedure of calculating an oscillation command based on the calculated oscillation amplitude and the calculated oscillation frequency; a position command storing procedure of storing a command route determined based on the calculated oscillation amplitude into a certain position command storage unit; an oscillation command correcting procedure of correcting the oscillation command based on the stored command route; and a driving procedure of determining a drive signal to be used for driving the servo motor based on the acquired position command and the corrected oscillation command, and outputting the drive signal.

According to the present invention, even if a vector given in a command to a machine tool changes every moment, the machine tool is still allowed to make oscillating motion along a command route.

DETAILED DESCRIPTION OF THE INVENTION

Examples of an embodiment of the present invention will be described below. A servo controller described in this embodiment is for a machine tool including multiple control axes. The servo controller is for making the machine tool used for machining by cutting of a work as a machining target perform intermittent cutting by causing a cutting tool and the work to oscillate relative to each other, particularly in a machining direction, thereby shredding chips.

The servo controller suggested in this embodiment is intended to drive a servo motor for a machine tool so as to perform oscillating motion based on a position command for each axis of the machine tool and a rotation speed of a spindle axis. This servo controller is capable of causing the machine tool to oscillate along a command route.

<Explanation of Principle of Oscillating Motion>

Figure 1A:
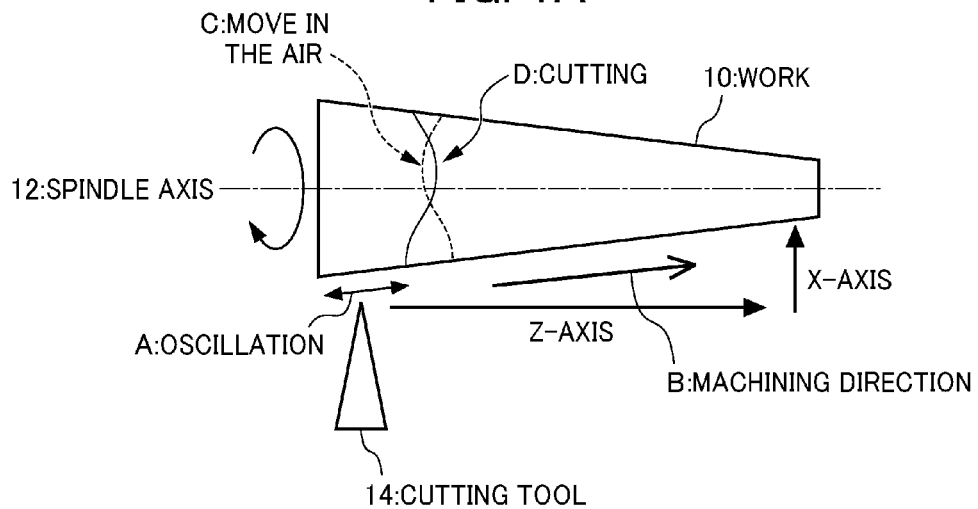
FIG. 1A is an explanatory view showing how machining by cutting is performed by generating oscillation.
Figure 1B:
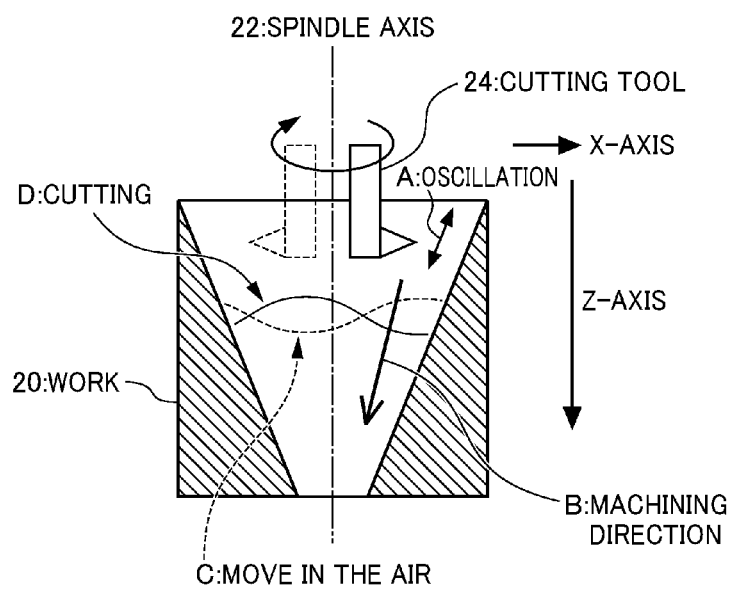
FIG. 1B is an explanatory view showing how machining by cutting is performed by generating oscillation.

FIGS. 1A and 1B are each an explanatory view for explaining oscillating motion. FIG. 1A is an explanatory view showing how a surface of a work 10 is subjected to machining by cutting with a cutting tool 14 while the work 10 is rotated about a spindle axis 12 as a rotary axis. As shown in FIG. 1A, an axis extending in the same direction as the spindle axis 12 is a Z-axis, and one of the axes orthogonal to the spindle axis 12 is an X-axis. The cutting tool 14 is used for cutting the surface of the work 10 based on a predetermined program. This machining proceeds along the Z-axis or in a machining direction B at a predetermined angle from the Z-axis. A direction in which the machining proceeds in this way is called the machining direction B.

During the aforementioned machining by cutting, oscillation A is applied to the cutting tool 14 in the machining direction B. The oscillation A is expected to achieve fine shredding of chips, for example. The oscillation A generates what is called vibration of the cutting tool 14 in the machining direction. The cutting tool 14 is to be placed in a contacting state and a non-contacting state with the work 10 repeatedly. If the cutting tool 14 contacts the work 10, the cutting tool 14 moves on the surface of the work 10 along a path of cutting D shown in FIG. 1A. If the cutting tool 14 does not contact the work 10, the cutting tool 14 moves on the surface of the work 10 along a path of move in the air C shown in FIG. 1A. The aforementioned intermittent cutting achieves fine shredding of chips or effective cooling of the cutting tool 14.

FIG. 1B is an explanatory view showing a different example of oscillation of a cutting tool. FIG. 1B is an explanatory view showing how a work 20 with an internal cavity is subjected to machining by cutting inside the cavity with a cutting tool 24. In FIG. 1B, the cutting tool 24 rotates relative to the work 20 and the axis of the cutting tool 24 functions as a spindle axis. Specifically, in this specification, a spindle axis means the following two axes. In FIG. 1A, the spindle axis 12 means an axis about which the work 10 rotates. In FIG. 1B, the spindle axis 22 means an axis about which the cutting tool 24 rotates. Like in FIG. 1A, an axis extending in the same direction as the spindle axis 22 in FIG. 1B is the Z-axis, and one of the axes orthogonal to the spindle axis 22 in FIG. 1B is the X-axis. The cutting tool 24 is used for cutting a surface of the inside of the cavity of the work 20 based on a predetermined program. Like in FIG. 1A, this machining proceeds in the machining direction B.

In FIG. 1B, the oscillation A is also applied to the cutting tool 24 in the machining direction B and the cutting tool 24 is also to be placed in a contacting state and a non-contacting state with the work 20 repeatedly. If the cutting tool 24 contacts the work 20, the cutting tool 24 moves on the surface of the work 20 along a path of the cutting D shown in FIG. 1B. If the cutting tool 24 does not contact the work 20, the cutting tool 24 moves on the surface of the work 20 along a path of move in the air C shown in FIG. 1B. FIGS. 1A and 1B both show the examples where the cutting tools 14 and 24 are caused to oscillate. Alternatively, the configuration may also be such that the work 10 or 20 is caused to oscillate.

The servo controller suggested in this embodiment is characteristically responsible for control over the aforementioned oscillating motion. In principle, oscillation can basically be achieved by giving a command for the oscillation in addition to a primary command to a servo motor for driving the cutting tool 14 (24), etc. As described above regarding the conventional art, however, if instruction for oscillation is given in consideration of only a command (a position command or a rotation speed of a spindle axis) at the time of the instruction and this command changes a command vector every moment, applying oscillation along a route of the command vector is considered to be difficult. This may occur if machining is to proceed along a machining route of an arc-like shape, for example.

According to this embodiment, oscillating motion is performed based on a position command to each axis and a rotation speed of a spindle axis. More specifically, based on the position command and the rotation speed of the spindle axis, amplitude of oscillation (oscillation amplitude) is calculated. Based on the rotation speed of the spindle axis, a frequency of the oscillation (oscillation frequency) is calculated. An oscillation command is calculated based on the calculated oscillation amplitude and the calculated oscillation frequency. According to this embodiment, a command route of a longer distance than the calculated oscillation amplitude is stored. Storing such a long command route makes it possible to apply oscillation in consideration of a route in the past. A route mentioned in this specification means a machining route. More specifically, this machining route is a route to be followed by a cutting tool in response to a position command given to the cutting tool, for example. If the cutting tool is fixed, this route may be a route along which a work is to move. According to this embodiment, a command route is stored, and an oscillation command is corrected based on the stored command route. As a result, even if a position command given to a machine tool changes a command vector every moment, oscillation can still be applied along a (machining) route.

Driving of a servo motor is controlled based on the position command output to each control axis of a machine tool and the above-described corrected oscillation command. This embodiment characteristically stores a command route. This makes it possible to correct an oscillation command based on the stored command route. The position command and the corrected oscillation command are given through an external amplifier to the servo motor of the machine tool. By doing so, oscillation motion can be performed along the command route. The oscillation command may include the amount of feed of a cutting tool, the amount of forward motion, the amount of backward motion, a forward motion speed, and a backward motion speed of the cutting tool, for example.

<Configuration>

Figure 2:
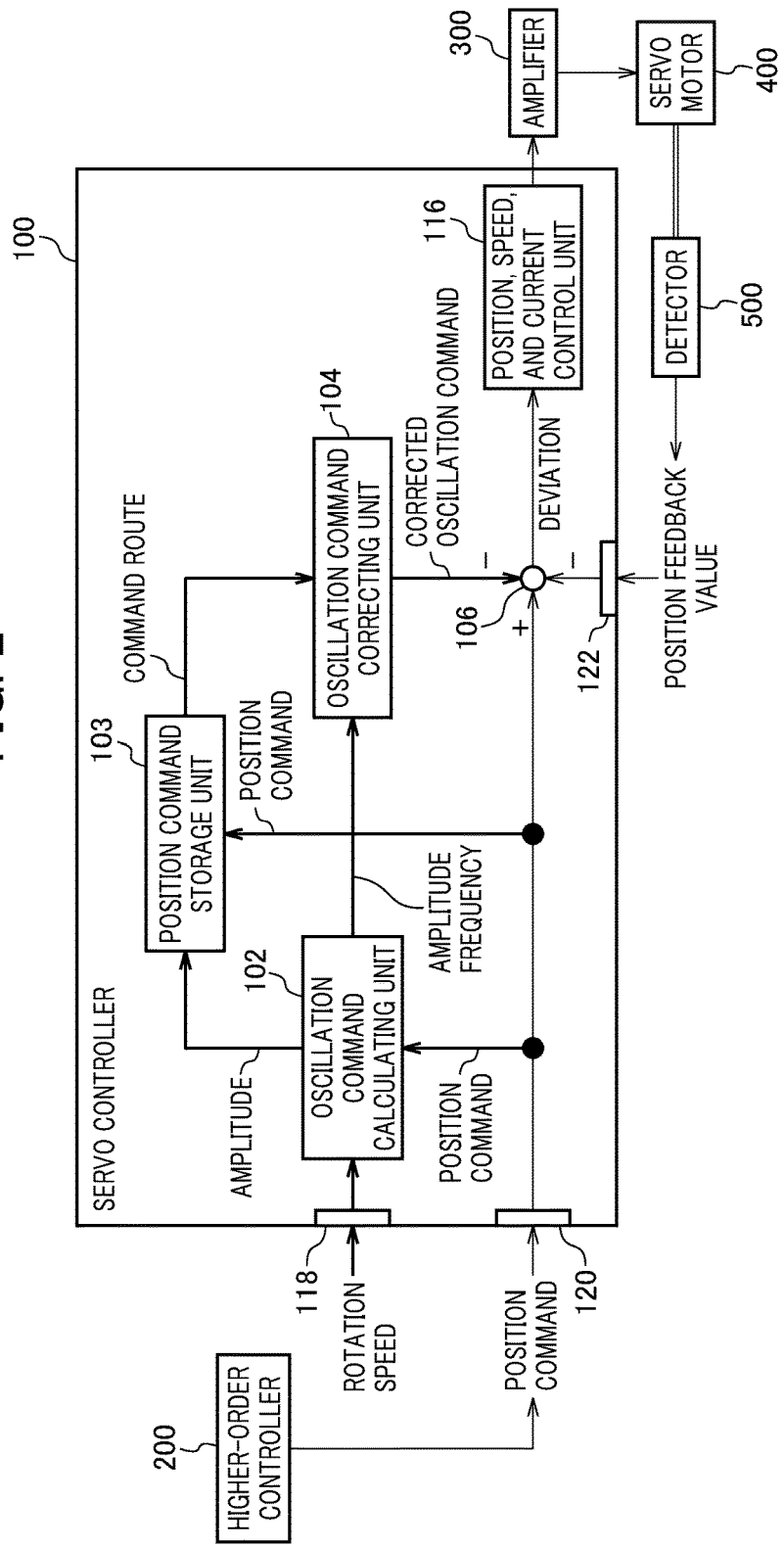
FIG. 2 is a configurational block diagram of a servo controller according to an embodiment.

The configuration of a servo controller 100 according to this embodiment will be described next based on the drawings. FIG. 2 is a configurational block diagram of the servo controller 100 according to this embodiment. As shown in FIG. 2, a higher-order controller 200 outputs a position command. The servo controller 100 drives a servo motor 400 of a machine tool (not shown in the drawings) to control a cutting tool of the machine tool or a work so as to comply with the position command. The servo controller 100 corresponds to a preferred example of a controller according to Claims. The higher-order controller 200 is a higher-order controller for control over the machine tool through the servo controller 100. For example, the higher-order controller 200 can be configured as a computer. As another example, the higher-order controller 200 may be configured as a control console or a control panel to be operated by a user. As another example, the higher-order controller 200 may be configured as an administration device (administration computer) responsible for administration of multiple machine tools in an integrated fashion. As a different example, the higher-order controller 200 may be configured as a controller (control computer) responsible for overall control of a factory.

The servo controller 100 is preferably formed of a computer including a CPU and a memory. Each unit described below (each calculating unit, a control unit, etc.) can be realized by execution of a predetermined program in the memory by the CPU. This program is stored in a non-transitory computer-readable recording medium according to Claims.

The servo controller 100 according to this embodiment includes an oscillation command calculating unit 102, a position command storage unit 103, an oscillation command correcting unit 104, and a position, speed, and current control unit 116. The oscillation command calculating unit 102 calculates an oscillation command based on a rotation speed of a spindle axis and a position command output from the higher-order controller 200. The position command storage unit 103 stores the position command. The oscillation command correcting unit 104 corrects the oscillation command based on a command route stored in the position command storage unit 103. The position, speed, and current control unit 116 determines a drive signal to be given to a servo motor by adding the corrected oscillation command to the position command.

The servo controller 100 further includes a rotation speed acquiring unit 118 that acquires a rotation speed of a spindle axis, a position command acquiring unit 120 that acquires a position command from the higher-order controller 200, and a position acquiring unit 122 that acquires a position feedback value. A rotation speed of the spindle axis may be the number of rotations per minute (per second), or may be an angular speed. Each of these acquiring units is preferably configured by using an input interface of a computer, a program that acquires information by controlling the input interface, and a CPU that executes the program. This program is also stored in the non-transitory computer-readable recording medium according to Claims. Each of these acquiring units may include a buffer for storing data received from outside, for example.

<Operation>

The operation of the servo controller 100 will be described in detail below based on the configurational block diagram of FIG. 2, the operation explanatory view of FIG. 3, and the flowchart of FIG. 4. The position command acquiring unit 120 is an interface that acquires a position command directed to the servo motor for driving a cutting tool or a position command directed to the servo motor 400 for driving a work, both output from the higher-order controller 200. The acquired position command is supplied to the oscillation command calculating unit 102, the position command storage unit 103, the oscillation command correcting unit 104, and an adder 106. The position command acquiring unit 120 corresponds to a preferred example of a position command acquiring unit according to Claims. Additionally, the operation of acquiring the position command performed by the position command acquiring unit 120 corresponds to step S1 of FIG. 4.

The rotation speed acquiring unit 118 is an interface that acquires a rotation speed of a spindle axis of the rotated work or that of a spindle axis of the rotated cutting tool. The acquired rotation speed is supplied to the oscillation command calculating unit 102. The rotation speed acquiring unit 118 corresponds to a preferred example of a rotation speed acquiring unit according to Claims. The operation of acquiring the rotation speed of the spindle axis performed by the rotation speed acquiring unit 118 corresponds to a preferred example of step S2 in the flowchart of FIG. 4. A rotation speed mentioned in this embodiment may be a rotation speed of the cutting tool or that of the work. A rotation speed may be acquired using a rotation speed sensor provided on the spindle axis of the cutting tool, for example. Alternatively, a rotation speed may be determined based on the rate of time change of a position command output from the higher-order controller 200. Still alternatively, a rotation speed may preferably be calculated based on the rate of change (or a differential) of a position feedback value detected by a detector 500 for detecting an angle of rotation of the servo motor 400 described later.

The oscillation command calculating unit 102 calculates an oscillation command based on the acquired position command and the acquired rotation speed. More specifically, according to this embodiment, the oscillation command calculating unit 102 calculates an oscillation command by exerting a procedure described below based on the position command output from the higher-order controller 200. The following calculations are also performed by execution of a program describing the function of the oscillation command calculating unit 102 by the CPU of the servo controller 100. The oscillation command calculating unit 102 corresponds to a preferred example of an oscillation amplitude calculating unit, that of an oscillation frequency calculating unit, and that of an oscillation command calculating unit according to Claims.

First, the oscillation command calculating unit 102 calculates oscillation amplitude based on the acquired position command and the acquired rotation speed. For example, the oscillation command calculating unit 102 may determine the amount of feed during one rotation of the spindle axis based on the position command and the rotation speed of the spindle axis, and set oscillation amplitude by multiplying the determined amount of feed during one rotation by 1.5, for example. This numerical value, 1.5, corresponds to a preferred example of a first constant according to Claims. The oscillation command calculating unit 102 responsible for calculation of oscillation amplitude corresponds to a preferred example of the oscillation amplitude calculating unit according to Claims. The operation of calculating the oscillation amplitude performed by the oscillation command calculating unit 102 corresponds to oscillation amplitude calculating step as step S3 of FIG. 4.

Next, the oscillation command calculating unit 102 calculates an oscillation frequency based on the acquired rotation speed. For example, the oscillation command calculating unit 102 preferably determines a value by multiplying the rotation speed by 1.5, and sets a resultant value as an oscillation frequency. This numerical value, 1.5, corresponds to a preferred example of a second constant according to Claims. The oscillation command calculating unit 102 responsible for calculation of an oscillation frequency corresponds to a preferred example of the oscillation frequency calculating unit according to Claims. The operation of calculating the oscillation frequency performed by the oscillation command calculating unit 102 corresponds to an oscillation frequency calculating step as step S4 of FIG. 4.

Next, the oscillation command calculating unit 102 calculates an oscillation command based on the calculated oscillation amplitude and the calculated oscillation frequency. The calculated oscillation command is transmitted to the servo motor 400 together with the position command output from the higher-order controller 200. By doing so, oscillating motion is added to movement of the cutting tool (or work). The oscillation command calculating unit 102 responsible for calculation of an oscillation command corresponds to a preferred example of the oscillation command calculating unit according to Claims. The operation of calculating the oscillation command performed by the oscillation command calculating unit 102 corresponds to an oscillation command calculating step as step S5 of FIG. 4.

The position command storage unit 103 stores a position command based on the amplitude determined by the oscillation command calculating unit 102 and the position command. This position command stored in the position command storage unit 103 covers a route at least longer than the oscillation amplitude. Thus, the position command storage unit 103 stores multiple position commands to store what is called a "command route". The position command storage unit 103 is formed of a storage device such as a semiconductor storage device, a program for writing a position command into the storage device or reading a position command from the storage device, and the CPU of the servo controller 100 that executes this program. This program is also stored in the non-transitory computer-readable recording medium according to Claims. According to this embodiment, the position command storage unit 103 characteristically stores the command route longer than a route of the oscillation amplitude calculated by the oscillation command calculating unit 102. Storing the command route of such a length makes it possible to correct the oscillation command along this command route, as will be described later. The position command storage unit 103 corresponds to a preferred example of a position command storage unit according to Claims. The storage operation performed by the position command storage unit 103 corresponds to a position command storing step as step S6 of FIG. 4.

Based on the command route stored in the position command storage unit 103, the oscillation command correcting unit 104 corrects the oscillation command calculated by the oscillation command calculating unit 102. The oscillation command correcting unit 104 is realized by a program describing operation of correcting an oscillation command, and the CPU of the servo controller 100 that executes this program.

<Correction of Oscillation Command>

According to this embodiment, the oscillation command correcting unit 104 corrects an oscillation command in consideration of a command route. This achieves smoother machining. FIG. 3 shows an example of the correction. FIG. 3 is an explanatory view showing how the tool moves on the work of FIG. 1A and how oscillation is applied during the movement. Like in FIG. 1A, the X-axis is defined in the vertical direction and the Z-axis is defined in the horizontal direction in FIG. 3.

Figure 3:
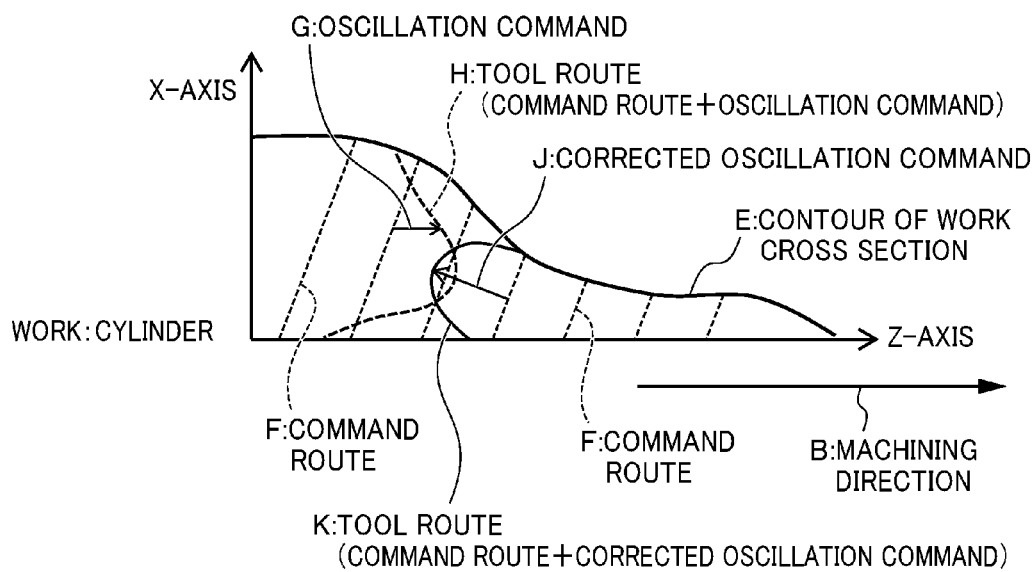
FIG. 3 is an explanatory view showing the characteristics of the operation of the servo controller according to this embodiment.

Like the work of FIG. 1A, the work of FIG. 3 has a substantially cylindrical shape. FIG. 3 shows that the work is subjected to machining into a shape shown in FIG. 3. FIG. 3 shows a shape resulting from the machining as a contour E of the cross section of the work. For machining on a surface of the work with the cutting tool, the cutting tool moves on the surface of the work based on a command route F. Like in FIG. 1A, the machining direction B of FIG. 3 is a direction of the Z-axis. Machining on the surface of the rotated work proceeds gradually with the cutting tool while the cutting tool moves sequentially from a left command route F to a right command route F.

According to this embodiment, an oscillation command G used by an existing controller is added to the command route F, thereby making the cutting tool follow a tool route H (see FIG. 3). The oscillation command G does not allow for a command route but is calculated based on a position command when the oscillation command G is given. As explained by referring to FIGS. 1A and 1B, the oscillation command G is intended to apply oscillation in the machining direction B, for example. By contrast, according to this embodiment, oscillation is corrected in consideration of a stored command route, so that an oscillation command can be corrected so as to apply oscillation along the command route in the past. FIG. 3 shows an oscillation command J corrected in this manner. Adding the corrected oscillation command J to a command route allows application of oscillation along the command route. This achieves smoother machining on the work. FIG. 3 shows a tool route K determined by adding the corrected oscillation command J. The oscillation command J is corrected so as to allow oscillating motion along the command route.

The oscillation command correcting unit 104 corresponds to a preferred example of an oscillation command correcting unit according to Claims. The above-described correction of the oscillation command corresponds to step S7 of FIG. 4. The oscillation command corrected in the above-described manner is added to the position command by the adder 106, and then supplied to the position, speed, and current control unit 116. Based on the position command including the added oscillation command as corrected, the position, speed, and current control unit 116 determines a drive signal to be used for driving the servo motor 400, and supplies (outputs) the drive signal to an external amplifier 300. Thus, the position, speed, and current control unit 116 and the adder 106 correspond to preferred examples of a driving unit according to Claims. The output of the drive signal made by the position, speed, and current control unit 116 and the adder 106 corresponds to step S8 in the flowchart of FIG. 4.

The amplifier 300 amplifies the aforementioned drive signal to supply the servo motor 400 with power sufficient for driving the servo motor 400. The servo motor 400 is driven using the (amplified) drive signal. FIG. 2 shows one amplifier 300 and one servo motor 400. Alternatively, multiple amplifiers 300 and multiple servo motors 400 may be provided. In the case of multi-axis control (in the case of a machine tool including multiple control axes), the number of the amplifiers 300 and that of the servo motors 400 may be determined to conform to the number of the control axes.

A detector 500 is provided to a drive shaft of the servo motor 400. The detector 500 is usable for detecting the position of the cutting tool and that of the work. The detector 500 can be configured by using a rotary encoder or a linear encoder, for example. The detector 500 outputs a position feedback value to the position acquiring unit 122. The position acquiring unit 122 is an interface that acquires the position of the cutting tool or that of the work as the position feedback value. The position feedback value acquired by the position acquiring unit 122 is added to the adder 106. This realizes implementation of what is called feedback control, so that the position of the servo motor 400 and a position determined by the position command can match each other more correctly.

Figure 4:
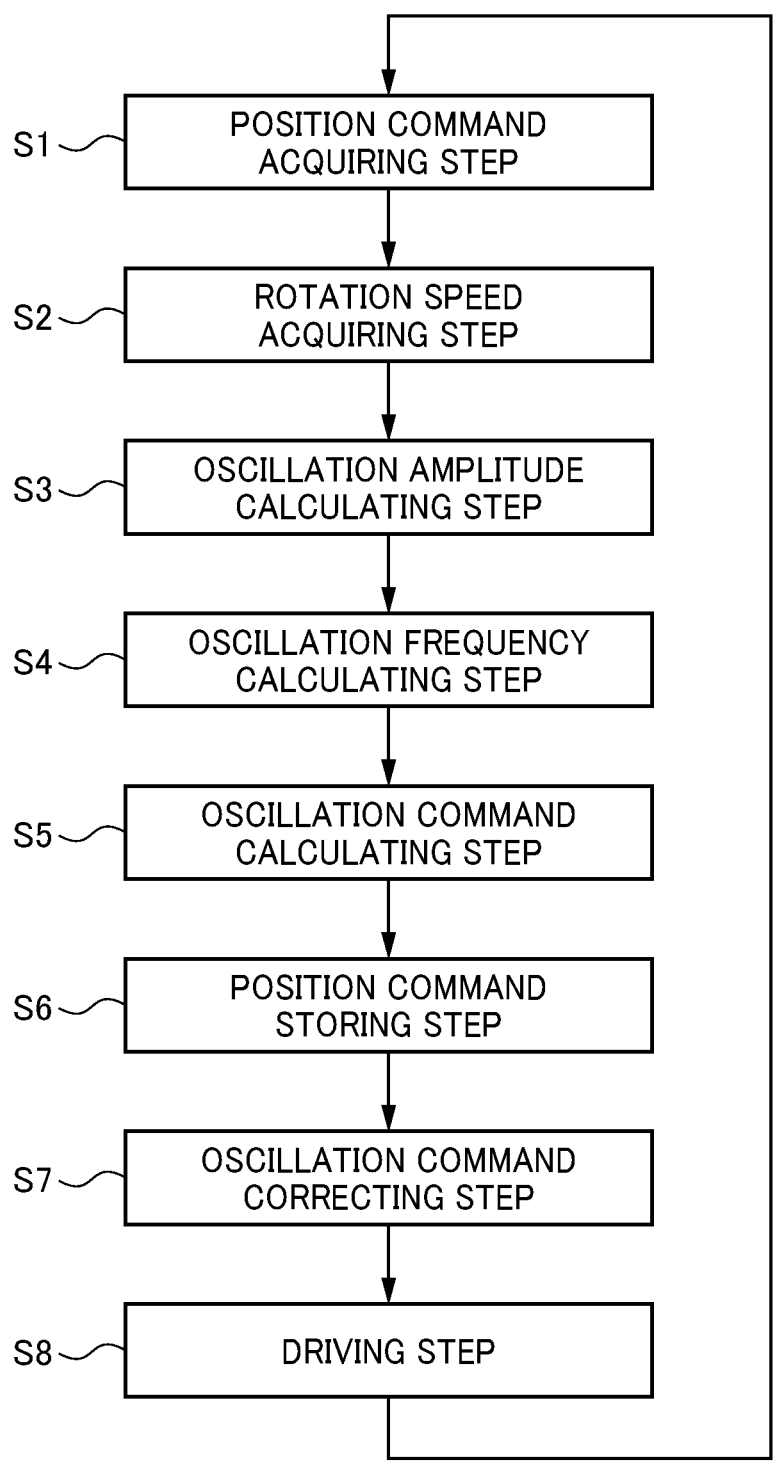
FIG. 4 is a flowchart showing the operation of the servo controller according to the embodiment.

In the flowchart of FIG. 4, after step S8, a position command output continuously from the higher-order controller 200 is acquired (step S1). Then, the subsequent steps are followed repeatedly. Meanwhile, the steps in the flowchart of FIG. 4 are actually executed continuously on an output position command. Thus, each of the steps in FIG. 4 can be executed in parallel. As described above, the servo controller 100 according to this embodiment causes a servo motor for a machine tool including multiple control axes to perform oscillating motion. In particular, according to this embodiment, an oscillation command is corrected based on a stored command route, so that oscillating motion can be made along a command route. According to this embodiment, oscillating motion is made based on a position command and a corrected oscillation command. In this way, oscillating motion can be made in consideration of a stored command route, so that machining on a work can be done more smoothly along the command route.

<Setting of First Constant and Second Constant>

According to this embodiment, the first constant for multiplication is set at 1.5. Meanwhile, the first constant can be set in a range from 0.5 to 10. Here, oscillation amplitude is generally required to be greater by 0.5 times or more than amplitude that produces a stroke (a stroke in a machining direction) (of the work 10 or the cutting tool 24) determined during one rotation of the spindle axis. A speed of the spindle axis during one rotation can also be estimated using change in the above-described angle of the spindle axis (an angular speed). A speed of move can also be estimated using change in a position command (a speed command). Time required for one rotation of the spindle axis is determined using the estimated angular speed. Thus, a stroke of the work (or the cutting tool) during one rotation of the spindle axis can be determined by multiplying the time of one rotation by the speed command.

Oscillation amplitude can be determined (set) by multiplying the stroke determined in the above-described manner by the first constant. The first constant may be set in such a manner that oscillation amplitude becomes greater by 0.5 times or more than a stroke in a machining direction. Such calculation of the first constant can be performed by a human, or by the servo controller 100 or the higher-order controller 200. For example, the first constant is preferably set in a range from a value exceeding 1 to a value less than 2, more preferably, in a range in the neighborhood of 1.5. These ranges of numerical values also correspond to preferred examples of the first constant according to Claims. According to this embodiment, the second constant for multiplication is also set at 1.5 as an example. Meanwhile, the second constant can be set in a range from 0.5 to 10. In particular, the second constant is preferably set in a range from a value exceeding 1 to a value less than 2, more preferably, in a range in the neighborhood of 1.5. These ranges of numerical values also correspond to preferred examples of the second constant according to Claims.

The higher-order controller 200 may be configured to give the first constant and the second constant to the servo controller 100. In this case, the servo controller 100 can store the given first constant and the given second constant into a certain memory in the servo controller 100. A user may set the first constant and the second constant by operating the higher-order controller 200. The user may set these constants by directly operating the servo controller 100.

<Control over Calculation of Oscillation Command>

The oscillation command calculating unit 102 may switch the following oscillation commands to be used for control depending on the purpose of machining by a machine tool: various oscillation commands other than an oscillation command for applying oscillation along a command route; and the oscillation command for applying oscillation along the command route. Alternatively, an oscillation command may be calculated by combining the various oscillation commands and the oscillation command for applying oscillation along the command route. For the purpose of shredding chips caused during cutting, for example, an oscillation command may be calculated so as to cause a cutting tool and a work to oscillate relative to each other in a machining direction in which the cutting tool travels. An oscillation command may also be calculated by combining such an oscillation command for applying oscillation in the machining direction and the above-described oscillation command for applying oscillation along the command route.

The oscillation command calculating unit 102 is preferably configured to start, stop, or finish calculation of an oscillation command in response to instruction given from outside. For example, the oscillation command calculating unit 102 may be configured to start, stop, or finish calculation of an oscillation command in response to instruction from the higher-order controller 200 as an external device.

The servo controller 100 is required to have an interface unit for receiving such instruction output from the higher-order controller 200. It is preferable that a different interface such as the rotation speed acquiring unit 118, etc. can be further used as this interface unit.

Like the oscillation command calculating unit 102, the oscillation command correcting unit 104 is preferably configured to start, stop, or finish correction of an oscillation command in response to instruction given from outside. For example, the oscillation command correcting unit 104 may be configured to start, stop, or finish correcting operation in response to instruction from the higher-order controller 200 as an external device. The oscillation command calculating unit 102 may also be used as an interface unit for receiving such instruction output from the higher-order controller 200. For example, the position command acquiring unit 120 may be used as this interface unit. Alternatively, a different dedicated interface may be prepared.

While the embodiment of the present invention has been shown in detail, the foregoing description of the embodiment merely shows particular examples to be employed for implementing the present invention. The technical scope of the present invention is not to be limited to the above-described embodiment. Various changes of the present invention can be devised in a range not departing from the scope of the invention, and these changes are also covered by the technical scope of the present invention.

EXPLANATION OF REFERENCE NUMERALS 10, 20 Work
12, 22 Spindle axis 14, 24 Cutting tool
100 Servo controller
102 Oscillation command calculating unit
103 Position command storage unit
104 Oscillation command correcting unit
106 Adder
116 Position, speed, and current control unit
118 Rotation speed acquiring unit
120 Position command acquiring unit
122 Position acquiring unit
200 Higher-order controller
300 Amplifier
400 Servo motor
500 Detector
A Oscillation
B Machining direction
C Move in the air
D Cutting
E Contour of work cross section
F Command route
G Oscillation command
H Tool route (command route+oscillation command)
J Corrected oscillation command
K Tool route (command route+corrected oscillation command)

What is claimed is:

1. A controller that controls a machine tool comprising multiple control axes and used for machining by cutting of a work as a machining target by means of coordinated motion of the control axes, the controller comprising:
a memory; and
a processor configured to execute the functions of:
a position command acquiring unit that acquires a position command directed to a servo motor for driving a cutting tool or a position command directed to a servo motor for driving the work;
a rotation speed acquiring unit that acquires a rotation speed of the rotated cutting tool or that of the rotated work;
an oscillation amplitude calculating unit that calculates oscillation amplitude based on the acquired position command and the acquired rotation speed;
an oscillation frequency calculating unit that calculates an oscillation frequency based on the acquired rotation speed;
an oscillation command calculating unit that calculates an oscillation command for causing the cutting tool and the work to oscillate relative to each other along a machining route along which the cutting tool travels, to shred chips caused during cutting, based on the calculated oscillation amplitude and the calculated oscillation frequency;
a position command storage unit that stores a command route determined based on the calculated oscillation amplitude;
an oscillation command correcting unit that corrects the oscillation command based on the stored command route; and
a driving unit that determines a drive signal to be used for driving the servo motor based on the acquired position command and the corrected oscillation command, and outputs the drive signal,
wherein the position command storage unit stores the command route which is at least longer than the oscillation amplitude, and
wherein the oscillation command correcting unit corrects the oscillation command so as to cause the cutting tool and the work to oscillate relative to each other along the stored command route.

2. The controller according to claim 1, wherein the oscillation amplitude calculating unit calculates the oscillation amplitude by determining a stroke during one rotation of the cutting tool or that of the work based on the acquired position command and the acquired rotation speed and by multiplying the determined stroke by a first constant.

3. The controller according to claim 2, wherein the first constant is provided from an external higher-order device and the provided first constant is used.

4. The controller according to claim 1, wherein the oscillation frequency calculating unit calculates the oscillation frequency by multiplying the acquired rotation speed by a second constant.

5. The controller according to claim 4, wherein the second constant is provided from an external higher-order device and the provided second constant is used.

6. The controller according to claim 1, wherein the oscillation command calculating unit starts, stops, or finishes calculation of the oscillation command based on a signal given from a higher-order controller.

7. The controller according to claim 1, wherein the oscillation command correcting unit starts, stops, or finishes correction of the oscillation command based on a signal given from a higher-order controller.

8. A method of controlling a machine tool comprising multiple control axes and used for machining by cutting of a work as a machining target by means of coordinated motion of the control axes, the method comprising:
a position command acquiring step of acquiring a position command directed to a servo motor for driving a cutting tool or a position command directed to a servo motor for driving the work;
a rotation speed acquiring step of acquiring a rotation speed of the rotated cutting tool or that of the rotated work;
an oscillation amplitude calculating step of calculating oscillation amplitude based on the acquired position command and the acquired rotation speed;
an oscillation frequency calculating step of calculating an oscillation frequency based on the acquired rotation speed;
an oscillation command calculating step of calculating an oscillation command for causing the cutting tool and the work to oscillate relative to each other along a machining route along which the cutting tool travels, to shred chips caused during cutting, based on the calculated oscillation amplitude and the calculated oscillation frequency;
a position command storing step of storing a command route determined based on the calculated oscillation amplitude into a certain position command storage unit;
an oscillation command correcting step of correcting the oscillation command based on the stored command route; and
a driving step of determining a drive signal to be used for driving the servo motor based on the acquired position command and the corrected oscillation command, and outputting the drive signal,
wherein the command route which is at least longer than the oscillation amplitude is stored in the position command storing step, and
wherein the oscillation command is corrected in the oscillation command correcting step so as to cause the cutting tool and the work to oscillate relative to each other along the stored command route.

9. A computer program that causes a computer to operate as a controller that controls a machine tool comprising multiple control axes and used for machining by cutting of a work as a machining target by means of coordinated motion of the control axes, the computer program causing the computer to execute:
- a position command acquiring procedure of acquiring a position command directed to a servo motor for driving a cutting tool or a position command directed to a servo motor for driving the work;
- a rotation speed acquiring procedure of acquiring a rotation speed of the rotated cutting tool or that of the rotated work;
- an oscillation amplitude calculating procedure of calculating oscillation amplitude based on the acquired position command and the acquired rotation speed;
- an oscillation frequency calculating procedure of calculating an oscillation frequency based on the acquired rotation speed;
- an oscillation command calculating procedure of calculating an oscillation command for causing the cutting tool and the work to oscillate relative to each other along a machining route along which the cutting tool travels, to shred chips caused during cutting, based on the calculated oscillation amplitude and the calculated oscillation frequency;
- a position command storing procedure of storing a command route determined based on the calculated oscillation amplitude into a certain position command storage unit;
- an oscillation command correcting procedure of correcting the oscillation command based on the stored command route; and
- a driving procedure of determining a drive signal to be used for driving the servo motor based on the acquired position command and the corrected oscillation command, and outputting the drive signal,
- wherein the command route which is at least longer than the oscillation amplitude is stored in the position command storing procedure, and
- wherein the oscillation command is corrected in the oscillation command correcting procedure so as to cause the cutting tool and the work to oscillate relative to each other along the stored command route.

* * * * *